United States Patent
Kasorla et al.

(10) Patent No.: US 9,098,401 B2
(45) Date of Patent: Aug. 4, 2015

(54) FAST SECURE ERASURE SCHEMES FOR NON-VOLATILE MEMORY

(71) Applicant: Apple Inc., Cupertino, CA (US)

(72) Inventors: Yoav Kasorla, Even Yehuda (IL); Eyal Gurgi, Petah-Tikva (IL)

(73) Assignee: Apple Inc., Cupertino, CA (US)

( * ) Notice: Subject to any disclaimer, the term of this patent is extended or adjusted under 35 U.S.C. 154(b) by 259 days.

(21) Appl. No.: 13/683,569

(22) Filed: Nov. 21, 2012

(65) Prior Publication Data

US 2014/0143475 A1 May 22, 2014

(51) Int. Cl.
*G06F 12/02* (2006.01)
*G06F 21/60* (2013.01)
*G06F 21/79* (2013.01)
*G11C 16/14* (2006.01)
*G11C 16/10* (2006.01)
*G11C 16/22* (2006.01)

(52) U.S. Cl.
CPC ............ *G06F 12/0246* (2013.01); *G06F 21/60* (2013.01); *G06F 21/79* (2013.01); *G11C 16/10* (2013.01); *G11C 16/14* (2013.01); *G11C 16/22* (2013.01); *G06F 2221/2143* (2013.01)

(58) Field of Classification Search
CPC .............. G11C 16/10; G11C 16/3459; G11C 11/5628; G11C 16/3454; G11C 13/0069; G11C 2211/5621; G11C 16/12; G11C 16/16; G11C 16/00

USPC .......................................... 711/103
See application file for complete search history.

(56) References Cited

U.S. PATENT DOCUMENTS

| | | | |
|---|---|---|---|
| 5,914,896 A | 6/1999 | Lee et al. | |
| 2006/0152762 A1 | 7/2006 | Asano et al. | |
| 2008/0021862 A1 | 1/2008 | Ohta | |
| 2010/0302862 A1* | 12/2010 | Lee | 365/185.19 |
| 2011/0258403 A1* | 10/2011 | Schnepper | 711/154 |
| 2012/0254515 A1 | 10/2012 | Melik-Martirosian et al. | |

OTHER PUBLICATIONS

International Search Report and Written Opinion from PCT/US2013/068665, mailed Feb. 17, 2014, Apple Inc., pp. 1-11.

* cited by examiner

*Primary Examiner* — Mardochee Chery
(74) *Attorney, Agent, or Firm* — Meyertons, Hood, Kivlin, Kowert & Goetzel, P.C.; Erik A. Heter (57) ABSTRACT

A method includes, in a memory with multiple analog memory cells, storing one or more data pages in respective groups of the memory cells using a first programming configuration having a first storage speed. Upon receiving a request to securely erase a data page from the memory, one or more of the memory cells in a group that stores the data page are re-programmed using a second programming configuration having a second storage speed that is faster than the first storage speed.

10 Claims, 4 Drawing Sheets

FAST SECURE ERASURE SCHEMES FOR NON-VOLATILE MEMORY

FIELD OF THE INVENTION

The present invention relates generally to non-volatile memory, and particularly to methods for secure erasure of data from non-volatile memory.

BACKGROUND OF THE INVENTION

Some non-volatile memory devices erase data logically but not physically. Thus, data that has been erased by a user may still be recoverable from the memory device. U.S. Pat. No. 8,130,554, whose disclosure is incorporated herein by reference, describes a method for securely erasing Flash-based memory. A new version of data is received for a logical location of a Flash-based memory. An old version of the data of the logical location is stored in a first physical location in the Flash-based memory. The old version of the data is caused to be subject to an obscure operation. The old version of the data is caused to be stored in a second physical location in the Flash-based memory.

U.S. Patent Application Publication 2010/0138619, whose disclosure is incorporated herein by reference, describes a method in which one or more target files are securely erased form a host storage medium such as a disk by overwriting the target files not just with "0"s, "1"s and/or random data, but also by overwriting them with portions of other selected, innocuous files found on the same medium. By booting the host using a secondary, preferably external mechanism before the host operating system is allowed to load, logging of file accesses and process execution by the host OS is circumvented. Post-replacement fragmentation and defragmentation may also be used to further reduce the detectability of the erasure, and the success of the process may be evaluated using statistical analysis.

U.S. Pat. No. 8,261,005, whose disclosure is incorporated herein by reference, describes an apparatus, system, and method for managing data with an empty data segment directive at the storage device. The apparatus, system, and method for managing data include a write request receiver module and a data segment token storage module. The write request receiver module receives a storage request from a requesting device. The storage request includes a request to store a data segment in a storage device. The data segment includes a series of repeated, identical characters or a series of repeated, identical character strings. The data segment token storage module stores a data segment token in the storage device. The data segment token includes at least a data segment identifier and a data segment length. The data segment token is substantially free of data from the data segment.

SUMMARY OF THE INVENTION

An embodiment of the present invention that is described herein provides a method including, in a memory with multiple analog memory cells, storing one or more data pages in respective groups of the memory cells using a first programming configuration having a first storage speed. Upon receiving a request to securely erase a data page from the memory, one or more of the memory cells in a group that stores the data page are re-programmed using a second programming configuration having a second storage speed that is faster than the first storage speed.

In some embodiments, storing the data pages using the first programming configuration includes applying to each group a first sequence of programming pulses that increase in magnitude by a first increment, and re-programming the memory cells using the second programming configuration includes applying to the group a second sequence of the programming pulses that increase in magnitude by a second increment, larger than the first increment.

In other embodiments, storing the data pages using the first programming configuration includes applying to the groups a first programming verification threshold, and re-programming the memory cells using the second programming configuration includes applying to the group a second programming verification threshold, lower than the first programming verification threshold.

In yet other embodiments, storing the data pages using the first programming configuration includes programming all the memory cells in each group, and re-programming the memory cells using the second programming configuration includes selecting a partial subset of the memory cells in the group, such that modification of data in the partial subset will render the data page irrecoverable, and re-programming only the memory cells in the partial subset.

There is additionally provided, in accordance with an embodiment of the present invention, an apparatus including an interface and storage circuitry. The interface is configured for communicating with a memory that includes multiple analog memory cells. The storage circuitry is configured to store one or more data pages in respective groups of the memory cells using a first programming configuration having a first storage speed, and, upon receiving a request to securely erase a data page from the memory, to re-program one or more of the memory cells in a group that stores the data page using a second programming configuration having a second storage speed that is faster than the first storage speed.

There is additionally provided, in accordance with an embodiment of the present invention, a system including a storage device and a host. The storage device includes a memory with multiple analog memory cells. The host is configured to send one or more data pages to the storage device for storage in the memory, and to send to the storage device a request to securely erase a data page from the memory. The storage device is configured to store the data pages in respective groups of the memory cells using a first programming configuration having a first storage speed, and, upon receiving the request to securely erase the data page, to re-program one or more of the memory cells in a group that stores the data page using a second programming configuration having a second storage speed that is faster than the first storage speed.

In some embodiments, the storage device includes a Solid State Drive (SSD).

The present invention will be more fully understood from the following detailed description of the embodiments thereof, taken together with the drawings in which:

DETAILED DESCRIPTION OF EMBODIMENTS

Overview

When data on a storage device is deleted by the user, the deleted data may be physically retained on the storage device for long periods of time, and possibly recovered. Therefore, conventional erasure of data by the user may be considered insecure. In many circumstances, sensitive data stored in the memory system must be erased from the storage device such that the deleted data cannot be retrieved or reconstructed. Embodiments of the present invention that are described herein provide improved secure erasure methods, which significantly reduce the time overhead needed to securely erase the data from the memory system.

In the disclosed embodiments, a processor typically stores the data in memory pages, or data pages, in a non-volatile memory device. A given memory page is programmed by applying a sequence of voltage pulses of incrementally increasing amplitude to the gates of the group of memory cells storing the page, so as to program individual memory cells to respective analog values corresponding to specific data values, or programming states. After each voltage pulse, the storage value is sampled by applying a programming verification threshold voltage to the gate to verify if the desired storage value was reached in a particular memory cell.

The disclosed embodiments provide fast secure erasure schemes that securely erase specific data pages and render the previously stored data irrecoverable. In a first scheme, when data stored in a memory page is to be securely erased, the storage circuitry programs the group of memory cells holding the page, e.g., with a constant data value or with random data. This over-writing operation is carried out using coarser programming than the programming used for data storage. For example, the storage circuitry may perform secure erasure by applying a sequence of voltage pulses that increase by a larger amplitude increment than the increment used in data storage. Coarse programming increases the erasure speed considerably, and is usually sufficient for garbling the previously-stored data.

In a second secure erasure scheme, one or more programming verification thresholds (referred to as verification thresholds or PV levels) are intentionally set to different lower values than the values used for data storage. The lower PV levels reduce erasure time, and are usually sufficient for garbling the data stored in the memory cells.

In a third scheme, the storage circuitry is configured to identify a partial subset of the group of memory cells storing the data page whose modification will render the data files irretrievable. In these embodiments, the storage circuitry over-writes the previous data only in the identified partial subset of the memory cells holding the page. As a result, erasure speed is increased.

System Description

Figure 1:
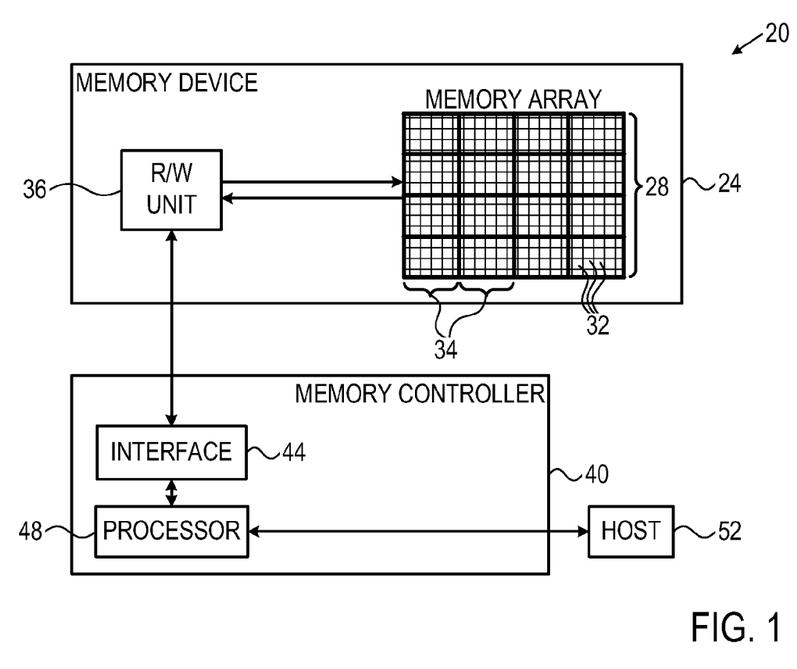
FIG. 1 is a block diagram that schematically illustrates a memory system, in accordance with an embodiment of the present invention.

FIG. 1 is a block diagram that schematically illustrates a memory system 20, in accordance with an embodiment of the present invention. System 20 can be used in various host systems and devices, such as in computing devices, cellular phones or other communication terminals, removable memory modules (sometimes referred to as "USB Flash Drives"), Solid State Disks (SSD), digital cameras, music and other media players and/or any other system or device in which data is stored and retrieved.

System 20 comprises a memory device 24, which stores data in a memory cell array 28. The memory array comprises multiple memory blocks 34. Each memory block 34 comprises multiple analog memory cells 32. In the context of the present patent application and in the claims, the term "analog memory cell" is used to describe any memory cell that holds a continuous, analog value of a physical parameter, such as an electrical voltage or charge. Array 28 may comprise analog memory cells of any kind, such as, for example, NAND, NOR and Charge Trap Flash (CTF) Flash cells, phase change RAM (PRAM, also referred to as Phase Change Memory—PCM), Nitride Read Only Memory (NROM), Ferroelectric RAM (FRAM), magnetic RAM (MRAM) and/or Dynamic RAM (DRAM) cells. Although the embodiments described herein refer mainly to two-dimensional (2D) cell connectivity schemes, the disclosed techniques are applicable to three-dimensional (3D) connectivity schemes, as well.

The charge levels stored in the cells and/or the analog voltages or currents written into and read out of the cells are referred to herein collectively as analog values, analog storage values or storage values. The storage values may comprise, for example, threshold voltages or any other suitable kind of storage values. System 20 stores data in the analog memory cells by programming the cells to assume respective programming states, which are also referred to as programming levels. The programming states are selected from a finite set of possible states, and each programming state corresponds to a certain nominal storage value. For example, a 3 bit/cell MLC can be programmed to assume one of eight possible programming states by writing one of eight possible nominal storage values into the cell.

Memory device 24 comprises a reading/writing (R/W) unit 36, which converts data for storage in the memory device to analog storage values and writes them into memory cells 32. In alternative embodiments, the R/W unit does not perform the conversion, but is provided with voltage samples, i.e., with the storage values for storage in the cells. When reading data out of array 28, R/W unit 36 converts the storage values of memory cells 32 into digital samples having a resolution of one or more bits. Data is typically written to and read from the memory cells in groups that are referred to as pages. In some embodiments, the R/W unit can erase a group of cells 32 by applying one or more negative erasure pulses to the cells. Erasure is typically performed in entire memory blocks.

The storage and retrieval of data in and out of memory device 24 is performed by a memory controller 40. The memory controller comprises an interface 44 for communicating with memory device 24, and a processor 48 that carries out the various memory management functions. Memory controller 40 communicates with a host 52, for accepting data for storage in the memory device and for outputting data retrieved from the memory device. Memory controller 40, and in particular processor 48, may be implemented in hardware. Alternatively, the memory controller may comprise a microprocessor that runs suitable software, or a combination of hardware and software elements.

The configuration of FIG. 1 is an exemplary system configuration, which is shown purely for the sake of conceptual clarity. Any other suitable memory system configuration can also be used. Elements that are not necessary for understanding the principles of the present invention, such as various interfaces, addressing circuits, timing and sequencing circuits and debugging circuits, have been omitted from the figure for clarity.

Although the example of FIG. 1 shows a single memory device 24, system 20 may comprise multiple memory devices that are controlled by memory controller 40. In the exemplary system configuration shown in FIG. 1, memory device 24 and memory controller 40 are implemented as two separate Integrated Circuits (ICs). In alternative embodiments, however, the memory device and the memory controller may be integrated on separate semiconductor dies in a single Multi-Chip Package (MCP) or System on Chip (SoC), and may be interconnected by an internal bus. Further alternatively, some or all of the memory controller circuitry may reside on the same die on which the memory array is disposed. Further alternatively, some or all of the functionality of memory controller 40 can be implemented in software and carried out by a processor or other element of the host system. In some embodiments, host 44 and memory controller 40 may be fabricated on the same die, or on separate dies in the same device package.

In some embodiments, memory controller 40 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

In an example configuration of array 28, memory cells 32 are arranged in multiple rows and columns, and each memory cell comprises a floating-gate transistor. The gates of the transistors in each row are connected by word lines, and the sources of the transistors in each column are connected by bit lines. The memory array is typically divided into multiple pages, i.e., groups of memory cells that are programmed and read simultaneously. Pages are sometimes sub-divided into sectors. In some embodiments, each page comprises an entire row of the array. In alternative embodiments, each row (word line) can be divided into two or more pages. For example, in some devices each row is divided into two pages, one comprising the odd-order cells and the other comprising the even-order cells.

Typically, memory controller 40 programs data in page units, but erases entire memory blocks 34. Typically although not necessarily, a memory block is on the order of $10^6$ memory cells, whereas a page is on the order of $10^3$-$10^4$ memory cells.

The disclosed techniques can be carried out by memory controller 40 and/or by R/W unit 36. For the sake of clarity, the description that follows refers to a particular division of functions between R/W unit 36 in the memory device and processor 48 in memory controller 40. Generally, however, the various tasks making-up the disclosed techniques can be divided between the memory controller and the R/W unit in any suitable manner, or performed by any one of these elements. Thus, in the context of the present patent application and in the claims, memory controller 40 and R/W circuitry 36 are referred to jointly as storage circuitry that carries out the disclosed techniques.

Figure 2:
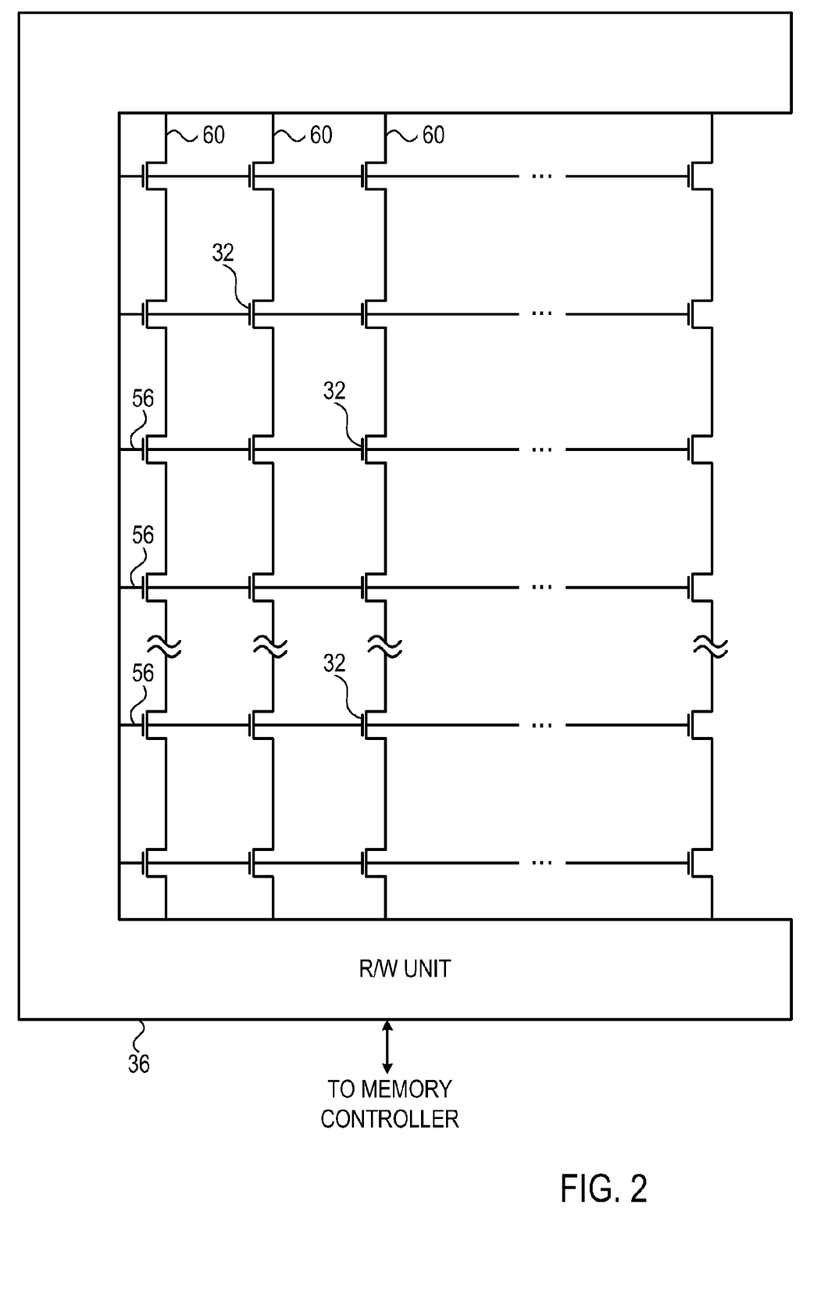
FIG. 2 is a block diagram that schematically illustrates a Read/Write (R/W) unit, in accordance with an embodiment of the present invention.

FIG. 2 is a block diagram that schematically illustrates R/W unit 36, in accordance with an embodiment of the present invention. As explained above, memory cells 32 are arranged in multiple rows and columns, and each memory cell comprises a floating-gate transistor. The gates of the cells in each row are connected by a respective word line 56, and the sources of the cells in each column are connected by a respective bit line 60. The memory cells (transistors) along each bit line 60 are connected source-to-drain in series with one another.

In a typical embodiment, R/W unit 36 converts data for storage into analog storage values, applies the appropriate voltages to the bit lines and word lines of the memory, and writes the analog values into memory cells 32. When reading data out of memory cells 32, R/W unit 36 typically converts the analog values of the memory cells into digital samples. R/W unit 36 is typically connected to memory controller 40 or other external system over a suitable interface.

It should be noted that the connectivity scheme of FIG. 2 is an example connectivity scheme, and that any other suitable connectivity scheme can be used in alternative embodiments, for example 3D schemes.

Implementing Fast Secure Erasure Schemes

Data is typically stored in a non-volatile memory (NVM) system and accessed by the host using logical addresses assigned to the data. Subsequently, the logical addresses are translated by the memory system to physical addresses where the data is stored in the memory. When the host or user deletes certain data, the logical addresses assigned to the data file are typically invalidated. The actual data stored in the memory, however, is often not physically erased but only logically invalidated. The data pages used to store the deleted data can remain on the memory device indefinitely and subsequently restored. In a typical Flash device, for example, the data is physically retained until the memory block in question is erased in preparation for storing new data.

Non-volatile memory (NVM) devices can be used to store sensitive data, such as personal information, financial data or access credentials, to name just a few examples. In some applications it is desirable to erase this data not only logically, but in a manner that makes the data physically irrecoverable. It is possible in principle to simply overwrite the data pages in question with random data or other data, but such schemes are typically very time consuming.

When a data page is programmed into a group of NVM memory cells 32, one or more column of cells are enabled by an enable signal applied to one or more bit lines 60 as shown in FIG. 2 in the example array of memory cells. A sequence of programming pulse voltages denoted $V_{WL}$ is then applied to a word line 56. The amplitude of each pulse voltage increases in magnitude incrementally for each successive pulse. Each voltage pulse in the sequence applied to the gate of an enabled memory cell in the array increases the storage value of the enabled memory cell, typically the threshold voltage.

After each voltage programming pulse, a program verification voltage (denoted PV level) is applied to the gate of the enabled memory cell to verify if the storage value of the enabled memory cell achieved the desired value. The memory system typically maintains a list of desired storage values and the corresponding stored data values, or programming state as will be described later. PV is typically set at the threshold voltage corresponding to the desired storage value such that current in the bit line through the enabled memory cell indicates that the particular memory cell achieved the desired threshold voltage, and thus stored the desired binary word.

If the desired storage value was achieved, the cell is disabled so as not to be affected by subsequent programming pulses on the word line. If not, the next voltage pulse with higher incremental amplitude is used to increase the stored analog threshold voltage. The programming method described above is sometimes referred to as increment step pulse programming (ISPP) since the amplitude between successive voltage pulses in the sequence increases by an increment as will be described below.

Figure 3A:
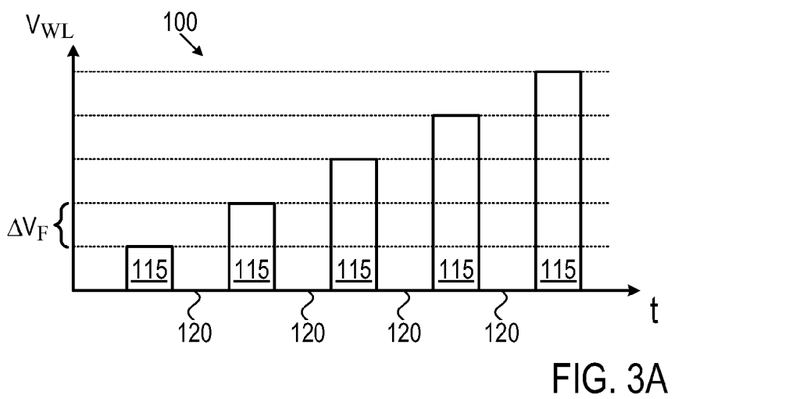
FIGS. 3A and 3B are diagrams that respectively illustrate a fine and a coarse programming pulse waveform used to program non-volatile memory cells, in accordance with an embodiment of the present invention.
Figure 3B:
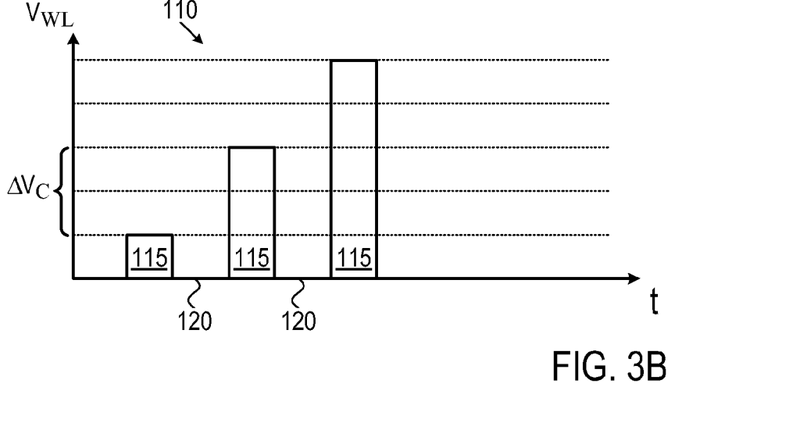

FIGS. 3A and 3B are diagrams that respectively illustrate a fine 100 and a coarse 110 programming pulse waveform used to program a group of non-volatile memory cells 32, in accordance with an embodiment of the present invention. FIG. 3A and FIG. 3B both show an ISPP voltage pulse waveform ($V_{WL}$ vs. time t) comprising a sequence of voltage pulses 115 applied to word line 56. A time interval 120 between adjacent pulses is the time in which the PV is applied to the gates of memory cell 32 to verify if the threshold voltage reached the desired value.

Voltage waveform 100 shown in FIG. 3A has a fine incremental change in the amplitude of voltage pulses in the sequence (fine ISPP) denoted as increment $\Delta V_F$. This fine waveform is used for storing data in the memory cells. Voltage waveform 110 in FIG. 3B, on the other hand, has a coarser incremental change in the amplitude of voltage pulses (coarse ISPP) in the sequence denoted as increment $\Delta V_C$ where $\Delta V_C > \Delta V_F$. The coarse waveform is used for secure erasure.

Waveform 110 programs the memory cells with reduced accuracy, relative to the accuracy achieved by waveform 100. For secure erasure, whose sole purpose is to render the previously-stored data irrecoverable, coarse programming is sufficient. As can be seen in the figure, the coarse programming waveform (FIG. 3B) comprises fewer pulses and is therefore faster than the fine programming waveform (FIG. 3A). By using waveform 110 instead of waveform 100 for secure erasure, erasure speed is increased.

Figure 4:
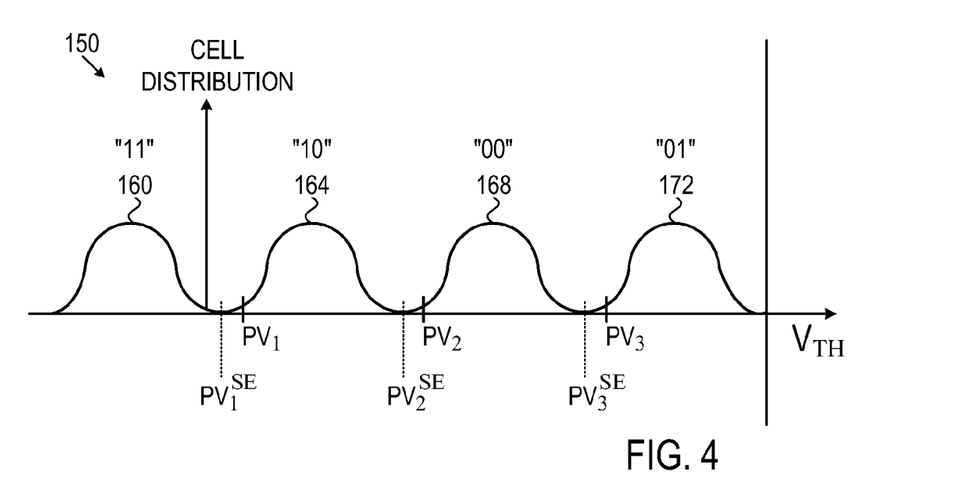
FIG. 4 is a graph that schematically illustrates programming-verification (PV) levels used for data programming and for secure erasure, in accordance with an embodiment of the present invention.

FIG. 4 is a graph that schematically illustrates a distribution 150 of storage values over non-volatile memory cells 32, and associated PV levels, in accordance with an embodiment of the present invention. The threshold voltage of memory cell 32 increases with each successive voltage pulse 115 in the sequence applied to the gate of memory cell 32 via the word line 56. The data value encoding scheme for multilevel NAND Flash memory as shown in FIG. 4 comprises two bits per cell, or four programming states.

Processor 48 is configured to identify a particular programming state when the threshold voltage value is within a predefined window of memory cell distribution as shown in FIG. 4. Thus, data value "11" is identified by memory cells whose threshold voltages are within distribution 160, data value "10" is given by distribution 164, data value "00" is given by distribution 168, and data value "01" is given by distribution 172. The threshold voltage of each un-programmed memory cell is initially set to a negative voltage (distribution 160), and each successive ISPP voltage pulse increases the threshold voltage until reaching the desired distribution associated with the desired stored data value.

When storing data, a certain pulse sequence (e.g., fine ISPP voltage waveform 100) is typically used to program memory cells 32. After each programming pulse 115, nominal program threshold verification voltages denoted $PV_1$, $PV_2$, $PV_3$ are applied to the gates of memory cells 32 in time intervals 120 between pulses 115 to verify if current conducts through respective bit lines which indicates that the threshold voltage on a particular memory cell is within the $V_{TH}$ distribution of the desired programming state. For example, $PV_1$ verifies if $V_{TH}$ of the gate was programmed into distribution 164 (corresponding to data value "10"), $PV_2$ verifies if $V_{TH}$ to distribution 168 (corresponding to data value "00"), and $PV_3$ verifies if $V_{TH}$ to distribution 172 (corresponding to data value "01") for the example configuration shown in FIG. 4.

When performing secure erasure, on the other hand, a second, faster programming configuration is used to garble the data. In the group of memory cells storing the data page to be securely erased, R/W unit 36 is configured to apply lower PV levels than the PV levels used for data storage. In other words, at least one of the PV levels used for secure erasure is lower than the corresponding PV level used for data storage.

In the example of FIG. 4, all three PV levels are lower: The PV levels used to verify the stored values on the memory cells during secure erasure are denoted $PV_1^{SE}$, $PV_2^{SE}$, and $PV_3^{SE}$ Corresponding to Distributions 164, 168 and 172, respectively. As can be seen in the figure, PV levels $PV_1^{SE}$, $PV_2^{SE}$, and $PV_3^{SE}$ are lower than PV levels $PV_1$, $PV_2$, and $PV_3$, respectively. The lower PV levels increase the erasure speed, and are typically sufficient for rendering the previously-stored data irrecoverable.

The example configurations for programming non-volatile memory shown in FIGS. 3A and 3B and FIG. 4 are for conceptual clarity, and not by way of limitation of the embodiments of the present invention. Any other suitable scheme can be used in alternative embodiments. Generally, the storage circuitry of system 20 may use any other suitable programming configurations, such that secure erasure is performed using a programming configuration having a higher programming speed than the programming configuration used for data storage.

For example, the incremental step in the amplitude of the voltage pulses denoted $\Delta V_F$ and $\Delta V_C$ are not necessarily constant from pulse to pulse. The four programming states of threshold voltage distributions between memory cells (e.g., distributions 160, 164, 168, and 172) may have any other suitable shapes or positions. Some embodiments may comprise any other suitable number of bits/cell, or programming states.

Figure 5:
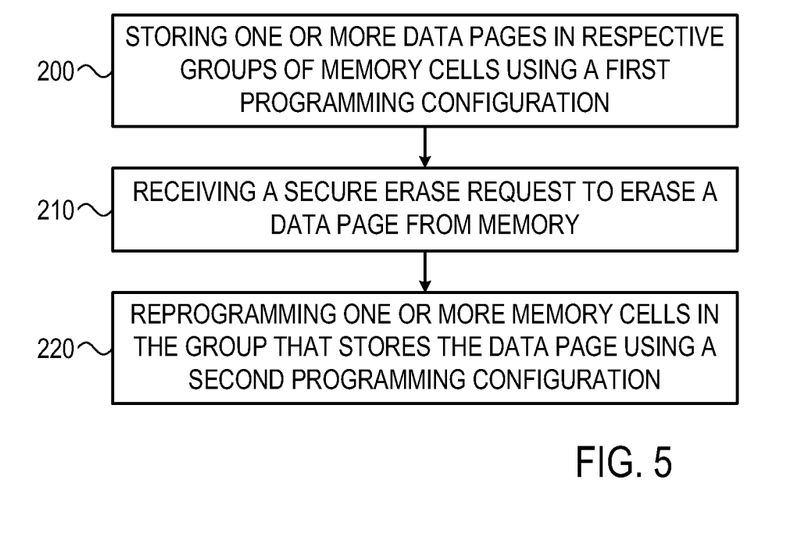
FIGS. 5 and 6 are flow charts that schematically illustrate methods for fast secure erase of data stored in a non-volatile memory, in accordance with embodiments of the present invention.

FIG. 5 is a flow chart that schematically illustrates a method for a fast secure erase of data stored in a non-volatile memory system, in accordance with embodiments of the present invention, referred to previously as the first and second secure erasure schemes. In a storing step 200, the storage circuitry (processor 48 and/or R/W unit 36) stores one or more data pages in respective groups of memory cells using a first programming configuration.

In a receiving step 210, a secure erase request is received from host 52 to erase a data page from memory. In an erasure step 220, the storage circuitry re-programs one or more memory cells in the group storing the data page (with different data) using a second programming configuration having a storage speed faster than that of the first programming configuration.

In an example embodiment, the first programming configuration uses the fine ISPP programming pulse waveform 100 of FIG. 3A, whereas the second programming configuration uses the coarse ISPP programming pulse waveform 110 of FIG. 3B. In another example embodiment, the first programming configuration uses the nominal PV levels $PV_1$, $PV_2$, and $PV_3$ of FIG. 4, whereas the second programming configuration uses the lower PV levels $PV_1^{SE}$, $PV_2^{SE}$, and $PV_3^{SE}$.

In some embodiments, it is sufficient to garble only a partial subset of the bits in a page (e.g., over-write the storage values of only a partial subset of the memory cells in the group holding the page) so as to render the entire data page irrecoverable.

For example, the stored data in the non-volatile memory system may comprise bits stored in a partial subset of the memory cells used for signature cyclic redundancy check (CRC), or redundancy bits used in error correction coding (ECC) schemes. Modifying a certain percentage of the data, redundancy and/or CRC bits is typically sufficient for rendering the entire page irrecoverable, without a need to modify or otherwise garble the other bits. The number of bits to modify typically depends upon the specific CRC or ECC scheme, but the locations of the garbled bits are not necessarily important. In other embodiments, it is necessary to garble a partial subset of bits in specific locations in the page. For example, certain private information may be stored in a predefined location in the page. Thus, in some embodiments memory controller 40 selects the appropriate partial subset of memory cells and reprograms the storage value of only the partial subset of the memory cells.

In an example embodiment, memory controller 40 garbles a pre-defined number of bits in the page, irrespective of their location. The pre-defined number may be, for example, slightly above the maximum error correction or detection capability of the ECC or CRC. For example, consider a Bose-Chaudhuri-Hocquenghem (BCH) code which is able to correct a maximum of t errors per page, where t is an integer. Garbling t+1 bits per page is enough to render the stored data irrecoverable. This number is much lower that the total number of redundancy bits used in the ECC and CRC schemes, e.g., by a factor of 14 or 16. The secure erasure schemes described above are extremely fast since only a small partial subset of the memory cells are re-programmed.

Figure 6:
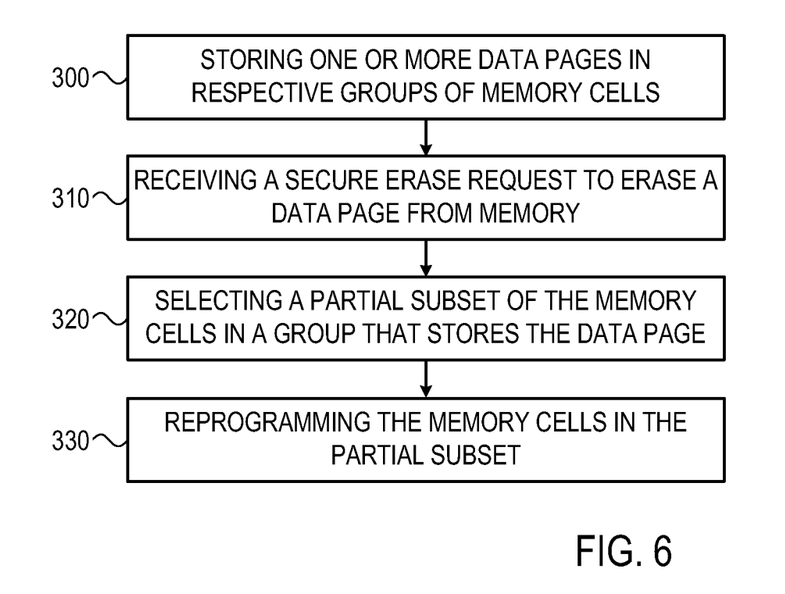

FIG. 6 is a flow chart that schematically illustrates a method for a fast secure erase of data stored in a non-volatile memory system, in accordance with embodiments of the present invention. In a storing step 300, the storage circuitry stores one or more data pages in respective groups of memory cells. In a receiving step 310, a secure erase request is received from host 52 to erase a data page from memory.

In a selecting step 320, a partial subset of memory cells in a group that stores the data page to be erased from the memory is selected by memory controller 40, such that modifying the storage values of the partial subset of memory cells in the group renders the data page irrecoverable. In a reprogramming step 330, the memory cells in the partial subset are reprogrammed so as to securely erase the data.

In any of the techniques described in FIGS. 3A, 3B and 4-6, secure erasure is carried out by over-writing previously-stored data with other data. The data used for over-writing may comprise, for example, constant data, random data, pre-defined data, data taken from another location in the memory, a modified version of the previous data, or any other suitable data whose programming renders the previous data irrecoverable.

In some embodiments, memory controller 40 does not have direct control over the data values stored in the memory cells. For example, in some embodiments the data is scrambled before storage, possibly by the host. In these embodiments, overwriting a certain number of memory cells with different data does not guarantee that a sufficient number of stored bit values will be modified. One possible solution (assuming the scrambling seed for the page does not change) is to read the page, invert the read data values ("0"↔"1") and rewrite the page with the inverted values.

Although the embodiments described herein mainly address fast secure erasure schemes in non-volatile memory systems, such as Flash memory, the methods for the fast secure erasure of data described herein can also be used in any type of suitable storage device.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a memory that includes multiple memory cells, storing one or more data pages in respective groups of the memory cells using a first programming configuration having a first storage speed, wherein storing the data pages using the first programming configuration comprises programming all the memory cells in each group; and
   upon receiving a request to securely erase a data page from the memory, re-programming one or more of the memory cells in a group that stores the data page using a second programming configuration having a second storage speed that is faster than the first storage speed, wherein re-programming the memory cells using the second programming configuration comprises selecting only a partial subset of the memory cells in the group, such that modification of data only in the partial subset will render the data page irrecoverable, and re-programming only the memory cells in the partial subset.

2. The method according to claim 1, wherein storing the data pages using the first programming configuration comprises applying to each group a first sequence of programming pulses that increase in magnitude by a first increment, and wherein re-programming the memory cells using the second programming configuration comprises applying to the group a second sequence of the programming pulses that increase in magnitude by a second increment, larger than the first increment.

3. The method according to claim 1, wherein storing the data pages using the first programming configuration comprises applying to the groups a first programming verification threshold, and wherein re-programming the memory cells using the second programming configuration comprises applying to the group a second programming verification threshold, lower than the first programming verification threshold.

4. An apparatus comprising:
   an interface for communicating with a memory that includes multiple memory cells; and
   storage circuitry, which is configured to store one or more data pages in respective groups of the memory cells using a first programming configuration having a first storage speed, and, upon receiving a request to securely erase a data page from the memory, to re-program one or more of the memory cells in a group that stores the data page using a second programming configuration having a second storage speed that is faster than the first storage speed;
   wherein the storage circuitry is configured to store the data pages using the first programming configuration by programming all the memory cells in each group, and to re-program the memory cells using the second programming configuration by selecting a only partial subset of the memory cells in the group, such that modification of data only in the partial subset will render the data page irrecoverable, and re-programming only the memory cells in the partial subset.

5. The apparatus according to claim 4, wherein the storage circuitry is configured to store the data pages using the first programming configuration by applying to each group a first sequence of programming pulses that increase in magnitude by a first increment, and to re-program the memory cells using the second programming configuration by applying to the group a second sequence of the programming pulses that increase in magnitude by a second increment, larger than the first increment.

6. The apparatus according to claim 4, wherein the storage circuitry is configured to store the data pages using the first programming configuration by applying to the groups a first programming verification threshold, and to re-program the memory cells using the second programming configuration by applying to the group a second programming verification threshold, lower than the first programming verification threshold.

7. A system, comprising:
- a storage device, comprising a memory that includes multiple memory cells; and
- a host, which is configured to send one or more data pages to the storage device for storage in the memory, and to send to the storage device a request to securely erase a data page from the memory,
- wherein the storage device is configured to store the data pages in respective groups of the memory cells using a first programming configuration having a first storage speed, and, upon receiving the request to securely erase the data page, to re-program one or more of the memory cells in a group that stores the data page using a second programming configuration having a second storage speed that is faster than the first storage speed; and
- wherein the storage device is configured to store the data pages using the first programming configuration by programming all the memory cells in each group, and to re-program the memory cells using the second programming configuration by selecting only a partial subset of the memory cells in the group, such that modification of data in only the partial subset will render the data page irrecoverable, and re-programming only the memory cells in the partial subset.

8. The system according to claim 7, wherein the storage device comprises a Solid State Drive (SSD).

9. The system according to claim 7, wherein the storage device is configured to store the data pages using the first programming configuration by applying to each group a first sequence of programming pulses that increase in magnitude by a first increment, and to re-program the memory cells using the second programming configuration by applying to the group a second sequence of the programming pulses that increase in magnitude by a second increment, larger than the first increment.

10. The system according to claim 7, wherein the storage device is configured to store the data pages using the first programming configuration by applying to the groups a first programming verification threshold, and to re-program the memory cells using the second programming configuration by applying to the group a second programming verification threshold, lower than the first programming verification threshold.

* * * * *